US006595907B1

(12) United States Patent
Ishikawa et al.

(10) Patent No.: US 6,595,907 B1
(45) Date of Patent: Jul. 22, 2003

(54) HEAT ROLLER FOR A FIXING DEVICE

(75) Inventors: Chuji Ishikawa, Kanagawa (JP); Takayuki Kuga, Saitama (JP); Yasuhiro Genjima, Saitama (JP); Haruo Ninomiya, Saitama (JP); Youichi Ueda, Miyagi (JP); Kazunori Kon, Miyagi (JP)

(73) Assignees: Ricoh Company, Ltd., Tokyo (JP); Origin Electric Company, Limited, Tokyo (JP); Tohoku Ricoh Co., Ltd., Shibata-gun (JP)

( * ) Notice: Subject to any disclaimer, the term of this patent is extended or adjusted under 35 U.S.C. 154(b) by 0 days.

(21) Appl. No.: 09/705,899

(22) Filed: Nov. 6, 2000

(30) Foreign Application Priority Data

Nov. 5, 1999 (JP) .......................................... 11-315412

(51) Int. Cl.[7] ............................................... B23P 15/00
(52) U.S. Cl. ........................................... 492/46; 492/56
(58) Field of Search ............................. 492/56, 54, 59, 492/46; 165/89; 399/279, 286

(56) References Cited

U.S. PATENT DOCUMENTS

| | | | | | |
|---|---|---|---|---|---|
| 4,466,164 | A | * | 8/1984 | Tadokoro et al. | 492/44 |
| 5,153,660 | A | * | 10/1992 | Goto | 219/469 |
| 5,741,616 | A | * | 4/1998 | Hirano et al. | 399/286 |
| 6,196,957 | B1 | * | 3/2001 | Hiraguri et al. | 492/46 |
| 6,212,349 | B1 | * | 4/2001 | Labombard | 399/286 |
| 6,283,903 | B1 | * | 9/2001 | Onuki et al. | 492/56 |
| 6,285,006 | B1 | * | 9/2001 | Hyllberg | 219/216 |
| 6,289,198 | B1 | * | 9/2001 | Kawamura et al. | 399/333 |
| 2001/0002954 | A1 | * | 6/2001 | Lambombard | 399/286 |
| 2001/0003562 | A1 | * | 6/2001 | Hachisuka et al. | 399/329 |
| 2001/0026705 | A1 | * | 10/2001 | Sato et al. | 399/98 |
| 2001/0026717 | A1 | * | 10/2001 | Kobaru et al. | 399/333 |
| 2001/0040097 | A1 | * | 11/2001 | Arao et al. | 205/82 |
| 2002/0006296 | A1 | * | 1/2002 | Omoto et al. | 399/330 |

FOREIGN PATENT DOCUMENTS

| | | |
|---|---|---|
| JP | 08-227245 | 1/1996 |
| JP | 8-227245 | 9/1996 |
| JP | 8-262908 | 10/1996 |

* cited by examiner

*Primary Examiner*—I Cuda-Rosenbaum
(74) *Attorney, Agent, or Firm*—Oblon, Spivak, McClelland, Maier & Neustadt, P.C.

(57) ABSTRACT

A heat roller for a fixing device included in an image forming apparatus has an insulation layer and a conductive layer sequentially formed on the inner periphery thereof. To form each of the insulation layer and conductive layer, a spray gun is inserted into the heat roller. Subsequently, paint, which is a liquid for forming the insulation layer or the conductive layer, is fed under pressure to the spray gun. The paint is radially jetted via the holes of the spray gun and evenly deposits on the inner surface of the heat roller. In this condition, the spray gun is moved in a preselected direction in order to coat the entire inner periphery of the heat roller. After the insulation layer has been formed and then sintered, the conductive layer is formed on the insulation layer and then sintered. The two layers can be formed in a short period of time and provides the heat roller with high quality at low cost. A method of producing the heat roller is also disclosed.

19 Claims, 4 Drawing Sheets

HEAT ROLLER FOR A FIXING DEVICE

BACKGROUND OF THE INVENTION

The present invention relates to a fixing device included in a copier, printer, facsimile apparatus or similar image forming apparatus and more particularly to a heat roller included in the fixing device and a method of producing the same.

A fixing device of the type using heat has customarily been included in an image forming apparatus for fixing a toner image formed on a paper sheet, OHP (Over Head Projector) film or similar recording medium. It is a common practice with this type of fixing device to press a press roller against a heat roller. While the press roller and heat roller, which is heated, convey a paper sheet while nipping it, toner on the paper sheet is melted by heat and fixed on the paper sheet thereby.

Today, there is an increasing demand for an image forming apparatus consuming a minimum of power from the environment standpoint. One of power saving schemes proposed in the past is an on-demand system that feeds current to a heater included in the fixing device only when a paper is passed through the device. However, the prerequisite with the on-demand system, which does not effect preheating, is that the surface of the heat roller be immediately heated to a preselected fixing temperature (usually about 180° C.) at the time of image formation, i.e., rapid warm-up of the fixing device.

A conventional heat roller includes a hollow metallic pipe accommodating a halogen lamp or similar heater therein. The heater generates heat for thereby heating the entire heat roller. An air layer intervenes between the core or base of the heat roller and the halogen lamp. Because heat is transferred from the halogen lamp to the heat roller by radiation, the air layer lowers heating efficiency. To implement rapid temperature elevation of the heat roller, it has been customary to reduce the wall thickness of the heat roller to 1 mm or below.

A direct heating system, or surface resistance heating system, is another scheme for implementing the rapid warm-up of the fixing device. The direct heating system causes an electric resistance body or similar heat generating layer formed on the outer or the inner periphery of the heat roller via an insulation layer to generate heat. This kind of system can realize a warm-up time shorter than that of the halogen lamp type of system by 20% to 30% because heat is transferred by conduction, as distinguished from radiation.

A heat roller for the direct heating system has been proposed in various forms in, e.g., Japanese Patent Laid-Open Publication Nos. 55-72390 and 7-325497. An insulation layer and a conductive layer have heretofore been formed on such a heat roller by screen printing, adhesion, plating or the like. This kind of method, however, not only needs a long period of time in forming the above layers, but also fails to cause sufficient adhesion to act between the two layers. For example, a procedure for connecting the metallic roller and insulation layer and the insulation layer and heat generating layer by adhesive is time-consuming and high cost. Moreover, air and moisture existing at the interface between the adjoining layers abruptly expand during heating, causing the insulation layer and/or the conduction layer to locally bulge or come off. The portions bulged or come off rise away from the metallic roller and obstruct heat from being released and are therefore heated. This causes the insulation layer and/or the conductive layer to burn.

The problem with the printing scheme or the adhesive scheme is that it is impossible or extremely difficult to form the insulation layer and conductive layer on a heat roller having curvature, irregularities or an irregular shape.

Technologies relating to the present invention are also disclosed in, e.g., Japanese Patent Laid-Open Publication Nos. 8-227245 and 8-262908.

SUMMARY OF THE INVENTION

It is therefore an object of the present invention to provide a high quality, low cost heat roller allowing an insulation layer and a conductive layer to be laminated thereon in a short period of time, and a method of producing the same.

In accordance with the present invention, in a heat roller including a metallic roller, an insulation layer formed on the metallic roller, and a conductive layer formed on the insulation layer to serve as a heat generating resistance body, the insulation layer and conductive layer are formed by a roll coater.

Also, in accordance with the present invention, in a method of producing a heat roller including a metallic roller, an insulation layer formed on the metallic roller, and a conductive layer formed on the insulation layer to serve as a heat generating resistance body, the insulation layer and conductive layer are formed by a roll coater.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
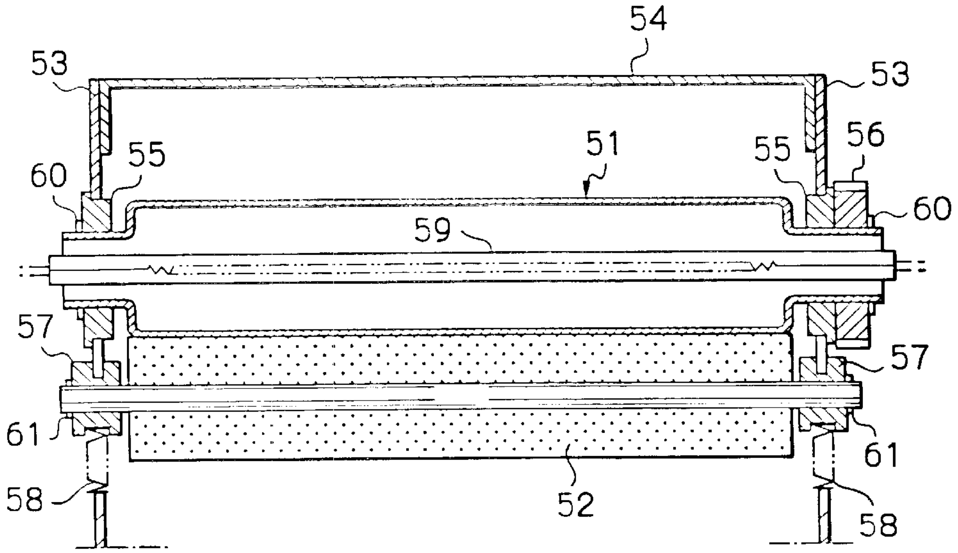
FIG. 1 PRIOR ART
FIG. 1 is a sectional view showing a specific configuration of a fixing device using a conventional heat roller.

To better understand the present invention, brief reference will be made to a conventional heat roller, shown in FIG. 1. As shown, the heat roller, generally 51, is implemented as a hollow metallic pipe accommodating a halogen lamp or similar heater 59 therein. A press roller 52 is pressed against the heat roller 51. There are also shown in FIG. 1 opposite side walls 53, an upper stay 54, bearings 55 rotatably supporting the heat roller 51, a drive gear 56 for driving the heat roller 51, bearings 57 rotatably supporting the press roller 52, springs 58 constantly biasing the press roller 52, and C rings 60 and 61 preventing the bearings from slipping out. The heat roller 51 is formed of iron or aluminum and has an outside diameter generally ranging from 20 mm to 50 mm.

An air layer intervenes between the core or base of the heat roller 51 and the halogen tamp 59. Because heat is transferred from the halogen lamp 59 to the heat roller 51 by radiation, the air layer lowers heating efficiency, as stated earlier. To implement rapid temperature elevation of the heat roller 51, it is necessary to reduce the wall thickness of the heat roller 51 to 1 mm or below.

Figure 2:
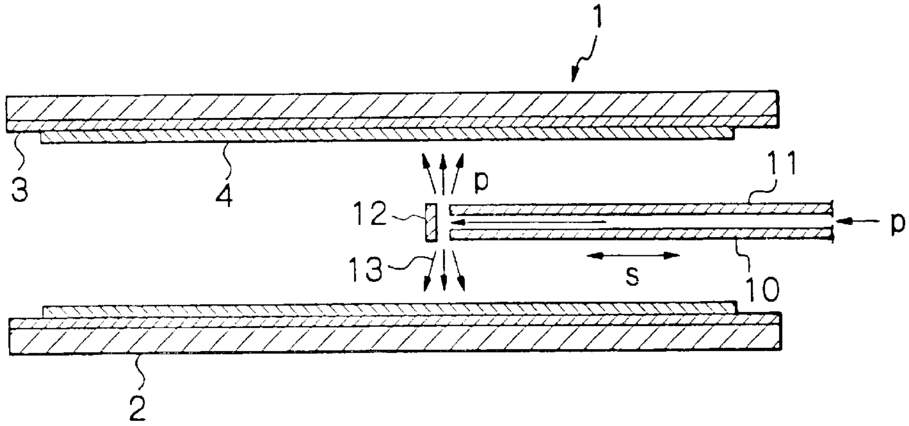
FIG. 2 is a sectional view showing a heat roller embodying the present invention together with a method of producing the same.

Referring to FIG. 2, a heat roller embodying the present invention will be described. As shown, the heat roller, generally 1, includes a pipe 2 formed of iron, aluminum or similar metal. A conductive layer or heating layer 4 is formed on the inner periphery of the pipe 2 with the intermediary of an insulation layer 3. The pipe 2 may have an outside diameter of 30 mm, a wall thickness of 0.4 mm and a length of 380 mm. The insulation layer 3 and conductive layer 4 may be laminated on the outer periphery of the pipe 2, if desired.

To produce the heat roller 1, an 82 wt. % of polyamide acid resin liquid, a 16 wt. % of $Al_2O_3$ and a 2 wt. % of additive are mixed together and stirred for preparing a mixture liquid whose viscosity is 600 CP. The liquid is evenly coated on the entire inner periphery of the pipe 2 by spraying so as to form the insulation layer 3. Specifically, a spray gun 10 may be inserted into the pipe 2 in order to spray paint P, i.e., the liquid having the above composition onto the inner periphery of the pipe 2.

Figure 3A:
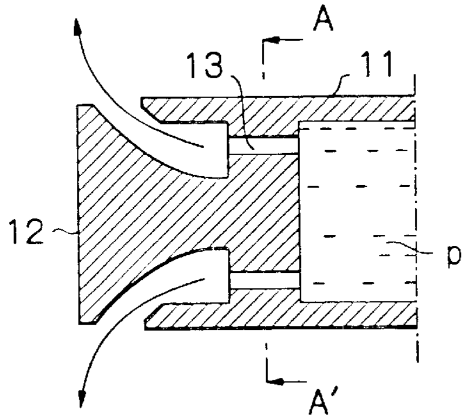
FIG. 3A is a fragmentary view showing a specific configuration of a spray gun applicable to the method of FIG. 2.
Figure 3B:
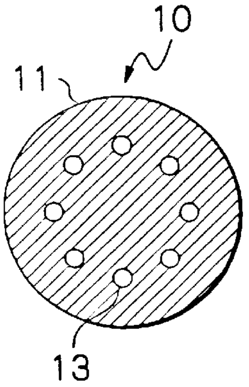
FIG. 3B is a section along line A–A' of FIG. 3A.

As shown in FIGS. 3A and 3B specifically, the spray gun 10 has a hollow pipe 11 formed with a plurality of holes 13 for jetting the paint P in its end wall. The holes 13 are spaced from each other in the circumferential direction of the pipe 11. A deflection wall 12 protrudes outward from the center of the end wall of the pipe 11 and has a generally trigonal-pyramidal cross-section. In operation, the paint P, more specifically a mixture of the paint P and air, is fed under pressure into the spray gun 10. The paint P is jetted via the holes 13 and then deflected along the deflection wall 12 substantially perpendicularly to the axis of the pipe 11. As a result, the paint P evenly deposits on the inner periphery of the pipe 2. In this condition, the spray gun 10 is moved deeper into the pipe 2 in a direction indicated by an arrow S in FIG. 2, coating the entire inner periphery of the pipe 2. The thickness of the insulation layer 3 may be controlled in terms of, e.g., viscosity, pressure or the moving speed of the spray gun 10. Subsequently, the insulation layer 3 is sintered at a preselected temperature for a preselected period of time to thereby form the insulation layer 3. In the illustrative embodiment, the insulation layer 3 is 70 $\mu$m thick. Such spray coating differs from adhesion in that it frees the insulation layer 3 from bubbles and gaps and insures the full transfer of heat to the pipe 2 via the layer 3.

After the sintering step, an 80 wt. % of polyamide-imide resin liquid, a 13 wt. % of Ag, a 5 wt. % of C (graphite) and a 2 wt. % of additive are mixed and stirred to prepare conductive paint whose viscosity is 800 CP. The conductive paint is coated on the insulation layer 3 by spray coating and then sintered in the same manner as the insulation layer 3, forming the conductive layer 4 whose thickness is about 40 $\mu$m. The thickness of the conductive layer 4 can be controlled in accordance with required resistance. The conductive layer 4 is shorter than the insulation layer 3 in the axial direction of the heat roller 1, as illustrated. To so configure the conductive layer 4, use is made of masking caps, as will be described specifically later.

After the insulation layer 3 and conductive layer 4 have been sequentially formed on the inner periphery of the heat roller 1, Teflon is coated on the outer periphery of the heat roller 1 to a thickness of about 18 $\mu$m, completing the heat roller 1.

To form the insulation layer 3 and conductive layer 4 on the outer periphery of the heat roller 1, a spray gun may spray the liquids at the outside of the heat roller 1. In such a case, the spray gun may be moved around the heat roller 1, or the heat roller may be rotated with the spray gun being fixed in place. Also, either one of the spray gun and heat roller 1 may be moved in the axial direction.

Figure 4:
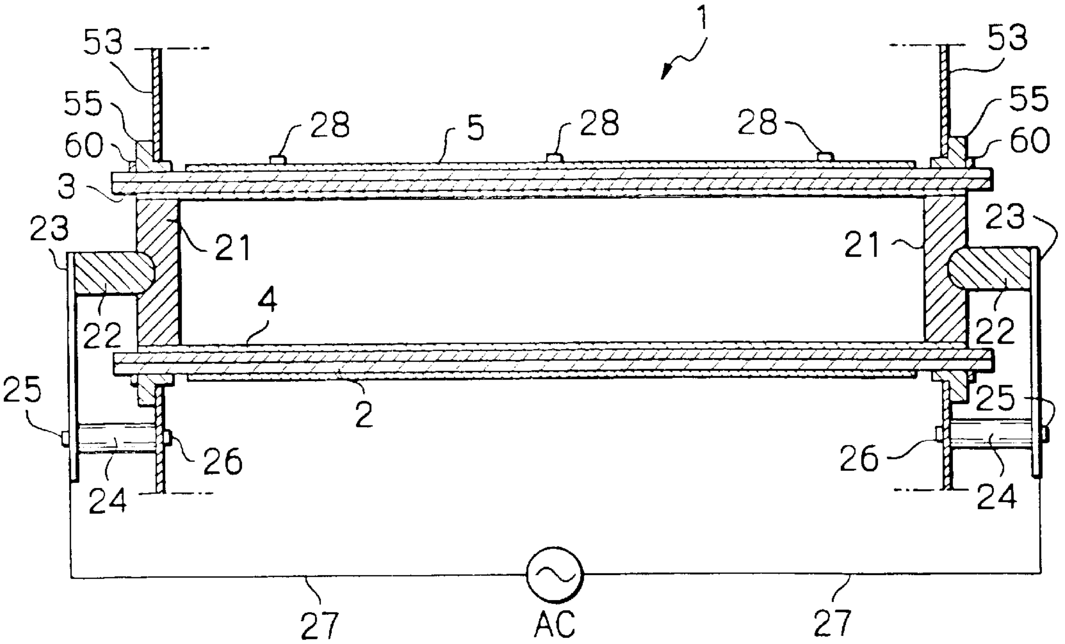
FIG. 4 is a view showing a specific arrangement for measuring the temperature elevation characteristic of the heat roller shown in FIG. 2.

FIG. 4 shows a specific arrangement for measuring the temperature elevation characteristic of the heat roller 1. As shown, two electrodes 21 formed of carbon are press-fitted in opposite ends of the heat roller 1 in close contact with the conductive layer 4. The electrodes 21 each are formed with a hemispherical concavity at the center of its outer end face. An electrode 22 implemented as a hemispherical lug is held in close contact with the wall of the above concavity. In the illustrative embodiment, the electrode 22 is formed of pure copper. Each electrode 22 is supported by a respective conductive leaf spring 23 that is, in turn, affixed to an electrically insulative stay 24 by a screw 25. The stay 24 is affixed to a frame 53 by a screw 26. In the illustrative embodiment, the insulative stay 24 is formed of phenol resin.

In the above configuration, the leaf springs 23 each resiliently press the respective electrode or lug 22 and therefore the electrode 21 contacting the electrode 22. The electrodes 22 and 21 contact each other with the hemispherical configuration. This, coupled with the self-lubrication of the electrode 21, allows the heat roller 1 to smoothly rotate in a sliding fashion. In practice, current is fed with the heat roller 1 being rotated. Such a configuration for measurement was based on the assumption of a marketable construction.

Leads 27 each are connected to the other end of one of the leaf springs 23. An AC voltage of 100 V was applied between the leads 27. Power applied was about 1,200 W. In this condition, the conductive layer 4 of the heat roller 1 had a volume resistivity of $2.75\times10^{-3}$ $\Omega$ cm, which was controlled in terms of the content of an inorganic filler contained in the conductive layer 4. A desired resistance was attained when the conductive film 4 was about 40 $\mu$m thick. The results of experiments are as follows.

[Result of Experiment 1]

The outer periphery (Teflon surface) of the heat roller 1 was heated from room temperature to 180° C. in 9.3 seconds. Specifically, as shown in FIG. 4, three thermocouples 28 were fitted on the center (in the axial direction) and opposite end portions of the outer periphery of the heat roller 1 in order to measure temperature. The center of the heat roller 1 was heated to 180° C. in 9.3 seconds while the opposite end portions were heated to the same temperature in 10.2 seconds. This difference is presumably ascribable to the radiation of heat from the opposite end portions of the heat roller 1. To uniform temperature throughout the heat roller 1, a particular thickness may be assigned to each of the center and opposite end portions of the conductive layer 4. Specifically, by making the center of the conductive layer 4 thicker than the opposite end portions, it is possible to cause the opposite end portions to generate more heat than the center.

[Result of Experiment 2]

A high voltage was applied between either one of the electrodes 21 and part of the iron pipe 2 where the Teflon layer was removed. In this condition, a breakdown voltage was measured to be 2.5 kV.

As for a heat roller, a desirable target time in which the outer periphery of the heat roller 1 is heated from room temperature to 180° C. is less than 10 seconds. Also, a desirable target breakdown voltage is higher than 1.5 kV for 1 minute. The heat roller 1 therefore achieves both of the target heating time and target breakdown voltage. Moreover, the insulation layer 3 and conductive layer 4 each need only 10 seconds for spray coating and 1 hour for sintering, which are far shorter than the conventional coating time and sintering time, reducing the cost to a considerable degree.

A conventional adhesive type of heat roller needs an extremely long production time because it must be cured for as long as 24 hours after adhesion and because use is made of a batch system, which cannot implement continuous sintering. Further, the quality of this type of heat roller is not stable due to peeling and irregular adhesion. By contrast, the illustrative embodiment allows heat rollers to be continuously coated and sintered while being moved by a conveyor and therefore realizes quantity production and energy saving.

Figure 5:
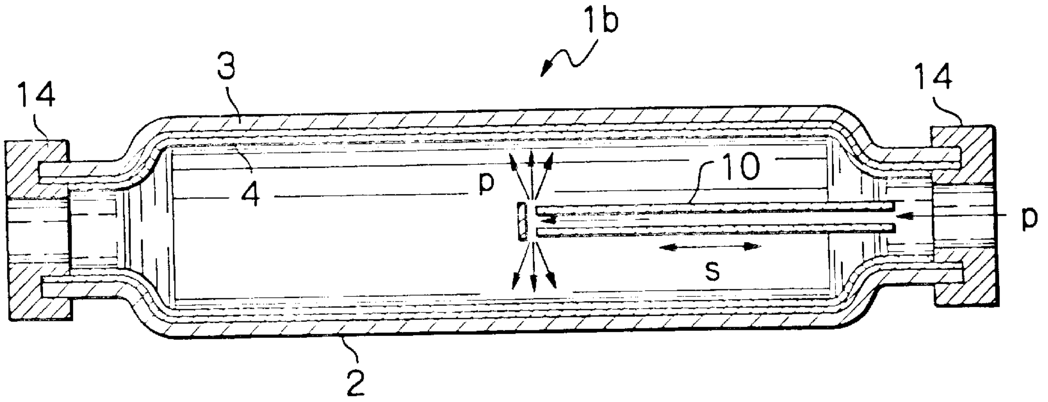
FIG. 5 is a sectional view showing a modification of the heat roller together with a method of producing the same.

Reference will be made to FIG. 5 for describing a modification of the heat roller of the illustrative embodiment and a method of producing the same. As shown, a modified heat roller 1*b* has opposite ends thereof reduced in diameter. Again, the spray gun 10 is inserted into the heat roller 1*b* so as to radially spray the paint P fed under pressure thereto, thereby forming the insulation layer 3 and conductive layer 4 on the inner periphery of the heat roller 1*b*. Specifically, after the insulation layer 3 has been formed (spray coating and sintering), masking caps 14 are fitted on opposite ends of the heat roller 1*b* such that each masks a preselected range of the end portion of the heat roller 1*b*. Subsequently, the conductive layer 4 is formed on the insulation layer 3. As a result, the insulation layer 3 has an axial width smaller than the axial width of the insulation layer 3. In this manner, the masking caps 14 prevent the paint expected to form the conductive layer 4 from coating even the end portions of the heat roller 1*b*. Such masking is effected during production.

In the case of the heat roller 1*b* having the squeezed end portions, it is impossible to form the insulation layer 3 and conductive layers 4 by the conventional adhesive scheme or the printing scheme. By contrast, the illustrative embodiment is capable of forming the two layers 3 and 4 even when the heat roller 1*b* has some irregularities or steps, because it causes paints to fly in a space. In addition, the illustrative embodiment is practicable with heat rollers having irregular shapes. Particularly, all heat rollers with outside diameters greater than 40 mm have their opposite ends squeezed without exception. Only a halogen lamp has been considered to be applicable to such heat rollers. The illustrative embodiment successfully reduces the warm-up time of a high-speed machine.

Figure 6:
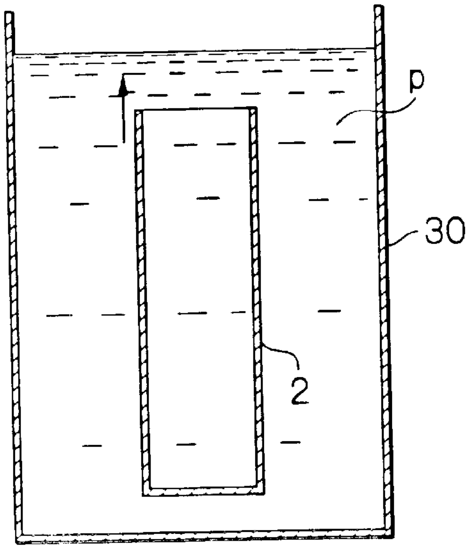
FIG. 6 is a view demonstrating a method using dip coating for producing the heat roller.

FIG. 6 shows an alternative procedure that uses dip coating for forming the insulation layer 3 and conductive layer 4. As shown, the paint P expected to form the insulation layer 3 or the conductive layer 4 is filled in a vessel 30 and stirred by a device not shown. The pipe 2 is dipped in the paint P and then pulled out. The portions of the pipe 2 other than the portions where the layer 3 or 4 should be formed are masked. Subsequently, the pipe 2 is subjected to sintering. Alternatively, the vessel 30 may be moved in the up-and-down direction relative to the pipe 2 fixed in place.

Figure 7:
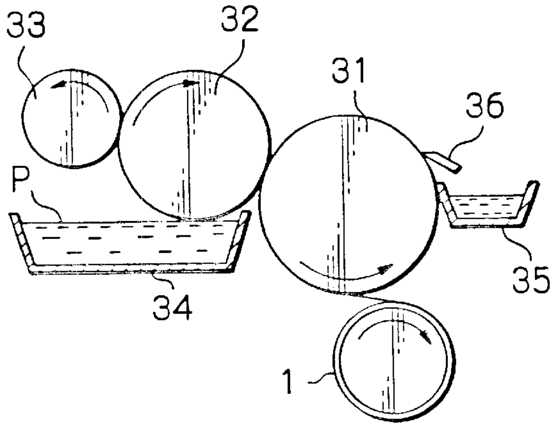
FIG. 7 is a view showing another method that coats the outer periphery of the heat roller with a roll coater.

Another alternative procedure for forming the insulation layer 3 or the conductive layer 4 will be described with reference to FIG. 7. As shown, a roll coater includes a tray 34 filled with the paint P. A feed roller 32 feeds the paint P to an application roller 31 that applies the paint P to the heat roller 1. A blade 36 is held in contact with the application roller 31 for returning the excess part of the paint P to the tray 35. A leveling roller 33 is held in contact with the feed roller 32. With this configuration, the roll coater forms the insulation layer 3 or the conductive layer 4 on the outer periphery of the heat roller 1.

Figure 8A:
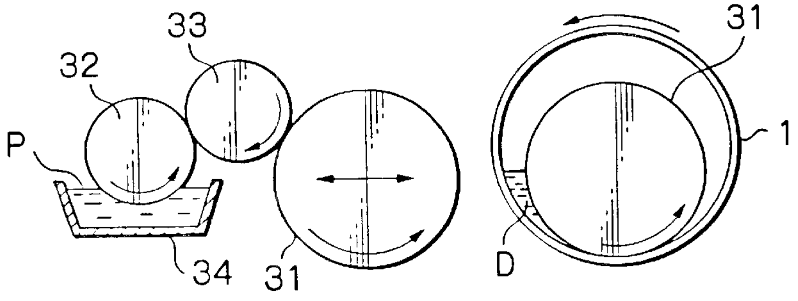
FIGS. 8A and 8B are views showing still another method that coats the inner periphery of the heat roller with a roll coater.
Figure 8B:
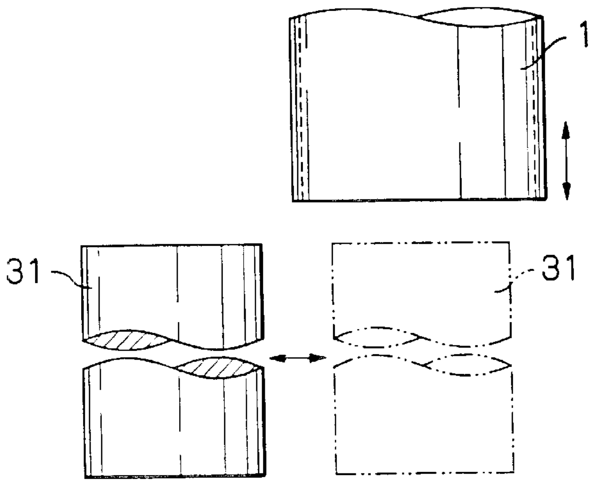

FIGS. 8A and 8B show another specific configuration of the roll coater configured to form the insulation layer 3 or the conductive layer 4 on the inner periphery of the heat roller 1. As shown in FIG. 8A, the paint P stored in the tray 34 is fed to the application roller 31, which is movable, by way of the feed roller 32 and leveling roller 33. As shown in FIG. 8B, after the application roller 31 has been released from the leveling roller 33, the heat roller 1 is coupled over the application roller 31. Subsequently, as shown in FIG. 8A, the heat roller and application roller 31 are rotated in the same direction (counterclockwise in FIG. 8A) with the latter contacting the inner periphery of the former. In FIG. 8A, a liquid well D is formed at the left-hand side of the application roller 31 where the roller 31 contacts the heat roller 1. With this configuration, the roll coater forms the insulation layer 3 or the conductive layer 4 on the inner periphery of the heat roller 1. Thereafter, the heat roller 1 is released from the applicator roller 31, and then the application roller 31 is returned to its initial position.

The composition of the insulation layer 3 and that of the conductive layer 4 included in the heat roller 1 will be described hereinafter. For the insulation layer 3, use may be made of a mixture liquid whose major components are an organic binder and an inorganic filler. In such a case, because the filler is dispersed in the binder to an adequate degree, the advantage of the filler and that of the binder are made most of at the same time. The inorganic filler is a good insulator and a good conductor. Although the organic binder is an insulator, it cannot efficiently transfer heat alone. The above mixture liquid therefore has desirable influence on the warm-up time of the fixing roller. In addition, the inorganic filler dispersed in the binder enhances insulation and heat conduction at a high level.

The organic binder of the insulation layer 3 may contain one or more of polyimide resin, epoxy resin and polyamide-imide resin. The inorganic filler may contain one or more of $Al_2O_3$, AlN, $SiO_2$ and SiC. In this case, the organic binder achieves heat resistance. This, coupled with the inorganic filler that is a good insulator and a good conductor, insures insulation and heat conduction while reducing the cost.

The insulating ability of the insulation layer 3 decreases with a decrease in the thickness of the layer 3. On the other hand, the heat conduction of the insulation layer 3 decreases with an increase in the thickness of the layer 3 (although not noticeable in the mixture of the organic binder and inorganic filler); in addition, the cost increases. It was experimentally found that the thickness of the insulation layer 3 should preferably lie in the range of from 30 $\mu$m to 100 $\mu$m in consideration of the balance between insulation, heat conduction and cost.

As for the conductive layer 4, use may be made of a mixture liquid of an organic binder and an inorganic filler. Because the inorganic filler is dispersed in the organic binder, resistance can be controlled in terms of the quantity and kind of the filler. Further, binders close to each other as to the coefficient of thermal expansion are selected for the conductive layer 4 and insulation layer 3. The two layers 3 and 4 therefore intensely adhere to each other at their interface and sparingly come off from each other.

The binder of the conductive layer 4, containing one or more of polyimide resin, epoxy resin and polyamide-imide resin, may be combined with an inorganic filler containing at least one of Ni, NiO, Ta, Ag, AgCu, C and Ag-plated inorganic substance. This composition also allows resistance to be controlled and insures close adhesion between the layers. Particularly, a material containing Ag or plated with Ag is not only lower in cost than Ag, but also comparable with Ag as to low resistance and efficient heat conduction.

Moreover, the conductive layer 4 has a PTC characteristic, i.e., it has resistance that increases with temperature elevation. Therefore, when temperature rises to a certain level, no current or little current flows through the conductive layer 4. This is successful to obviate smoke or fire when the fixing device is brought out of control.

The conductive layer 4 becomes short in strength if excessively thin or becomes short in resistance if excessively thick. Increasing the thickness of the conductive layer 4, of course, increases the cost. Experiments showed that the thickness of the conductive layer 4 should preferably lie in the range of from 10 $\mu$m to 100 $\mu$m in consideration of the balance between easy resistance control and cost.

The shape and size of the heat roller 1 and the material of the core of the heat roller 1 described above are only illustrative. Also, the spray gun used for spray coating and the configuration of the vessel used for dip coating may each have any suitable configuration other than one shown and described. Further, the composition of the paint used to form the insulation layer 3 or the conductive layer 4 in the illustrative embodiment is not limitative. For example, the combination of resins constituting the organic binder and the combination of inorganic substances constituting the inorganic filler are open to choice.

In summary, it will be seen that the present invention provides a heat roller and a method of producing the same having various unprecedented advantages, as enumerated below.

(1) The heat roller includes an insulation layer and a conductive layer, both of which are formed by spray coating and therefore uniform in thickness. Further, the two layers closely adhere to each other and do not come off or rise away from each other, providing the heat roller with high quality. In addition, the two layers and therefore the entire heat roller can be formed in a short period of time, reducing the production cost.

(2) The method produces the heat roller by forming the insulation layer and conductive layer by spray coating and therefore provides each of them with a uniform small thickness. Because paint flies in a space during spray coating, the layers can be easily formed even on a heat roller having a curved surface, some irregularities or steps or an irregular shape.

(3) When the insulation layer and conductive layer both are formed by dip coating, they each have a uniform thickness. Further, the two layers closely adhere to each other and do not come off or rise away from each other, providing the heat roller with high quality.

(4) Although dip coating needs a slightly longer period of time than spray coating, it implements a uniform thickness and readily forms even a thin film. In addition, the layers can be easily formed even on a heat roller having a curved surface, some irregularities or steps or an irregular shape.

(5) When the insulation layer and conductive layer are formed by a roll coater, each of them achieves a uniform thickness. Further, the two layers closely adhere to each other and do not come off or rise away from each other, providing the heat roller with high quality.

(6) Although the roll coater is slightly sophisticated in construction than a spray coater, it implements a uniform thickness and can easily form even a thin film.

(7) When use is made of a mixture liquid mainly consisting of an organic binder and an inorganic filler for the insulation layer, the insulation layer exhibits insulation and heat conduction at a high level because the binder and filler are fully mixed with each other.

(8) The organic binder of the insulation layer contains one or more of polyimide resin, epoxy resin and polyamide-imide resin. The inorganic filler contains one or more of $Al_2O_3$, AlN, $SiO_2$ and SiC. In this case, the organic binder achieves heat resistance. This, coupled with the inorganic filler that is a good insulator and a good conductor, insures insulation and heat conduction while reducing the cost.

(9) The insulation layer is 30 $\mu$m to 100 $\mu$m thick and makes the heat roller well balanced in insulation, heat conduction and cost and practical.

(10) As for the conductive layer, use is made of a mixture liquid of an organic binder and an inorganic filler. Because the inorganic filler is dispersed in the organic binder, resistance can be controlled in terms of the quantity and kind of the filler. Further, binders close to each other as to the coefficient of thermal expansion are selected for the conductive layer and insulation layer. The two layers and therefore intensely adhere to each other at their interface and sparingly come off from each other.

(11) The binder of the conductive layer, containing one or more of polyimide resin, epoxy resin and polyamide-imide resin, may be combined with an inorganic filler containing at least one of Ni, NiO, Ta, Ag, AgCu, C and Ag-plated inorganic substance. This composition also allows resistance to be controlled and insures tight contact between the layers. Particularly, a material containing Ag or plated with Ag is not only lower in cost than Ag, but also comparable with Ag as to low resistance and efficient heat conduction.

(12) The conductive layer has the previously stated PTC characteristic. Therefore, when temperature rises to a certain level, no current or little current flows through the conductive layer. This is successful to obviate smoke or fire when a fixing device including the heat roller is brought out of control. (13) The conductive layer has a thickness lying in the range of from 10 $\mu$m to 100 $\mu$m, so that the heat roller is well balanced in easy resistance control and cost and practical.

Various modifications will become possible for those skilled in the art after receiving the teachings of the present disclosure without departing from the scope thereof.

What is claimed is:

1. A heat roller, comprising a metallic roller, an insulation layer formed on said metallic roller, and a conductive layer formed on said insulation layer to serve as a heat generating resistance body, wherein said insulation layer comprises an organic binder and an inorganic filler and is resistant to a temperature of at least 180° C.; and said conductive layer is resistant to a temperature of at least 180° C.

2. The heat roller according to claim 1, wherein said organic binder is selected from the group consisting of a polyimide resin and polyamide-imide resin; and said inorganic filler is selected from the group consisting of $Al_2O_3$, AlN, $SiO_2$, and SiC.

3. The heat roller according to claim 1, wherein said insulation layer has a thickness of from 30 $\mu$m to 100 $\mu$m.

4. The heat roller according to claim 1, wherein said conductive layer comprises an organic binder and an inorganic filler.

5. The heat roller according to claim 4, wherein said organic binder is selected from the group consisting of a polyimide resin and polyamide-imide resin; and said inorganic filler is selected from the group consisting of Ni, NiO, Ta, Ag, AgCu, C, and Ag.

6. The heat roller according to claim 5, wherein said conductive layer has a positive resistance characteristic.

7. The heat roller according to claim 4, wherein said conductive layer has a positive resistance characteristic.

8. The heat roller according to claim 4, wherein said conductive layer has a thickness of from 10 μm to 100 μm.

9. The heat roller according to claim 1, wherein the metallic roller has a wall thickness of less than 1 mm.

10. The heat roller according to claim 1, wherein the metallic roller comprises iron or aluminum.

11. The heat roller according to claim 1, wherein the metallic roller has an outer diameter of at least 30 mm.

12. The heat roller according to claim 1, wherein the metallic roller has a length of at least 380 mm.

13. The heat roller according to claim 1, wherein the insulation layer and conductive layer are laminated on an outer periphery of the metallic roller.

14. The heat roller according to claim 1, wherein the insulation layer comprises at least 82% by weight of an organic binder and at least 16% by weight of an inorganic filler.

15. The heat roller according to claim 1, wherein the conductive layer comprises at least 80% by weight of an organic binder and at least 18% by weight of an inorganic filler.

16. The heat roller according to claim 1, wherein said heat roller has a breakdown voltage greater than 1.5 kV for 1 minute.

17. The heat roller according to claim 1, wherein the conductive layer has a volume resistivity of at least $2.75\times10^{-3}$ Ωcm.

18. The heat roller according to claim 1, wherein said heat roller is a fixing heat roller.

19. The heat roller according to claim 1, wherein said conductive layer comprises a mixture of liquid comprising an organic binder and an inorganic filler.

* * * * *